(No Model.)
A. HARROUN.
SUPPORT FOR CLIMBING PLANTS.
No. 278,706. Patented June 5, 1883.
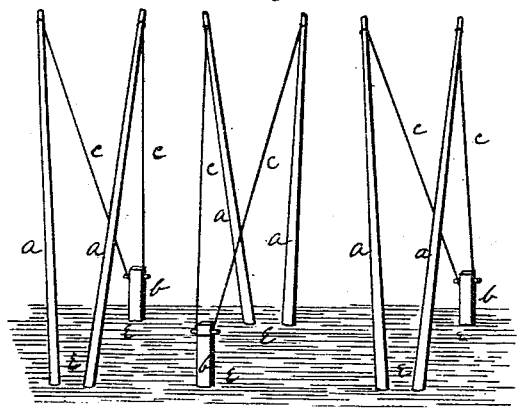
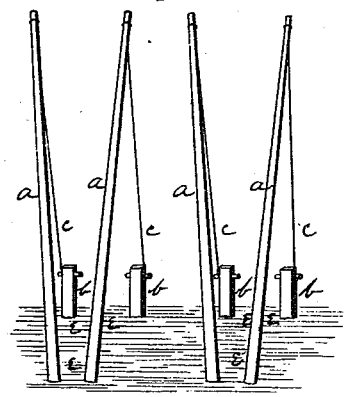
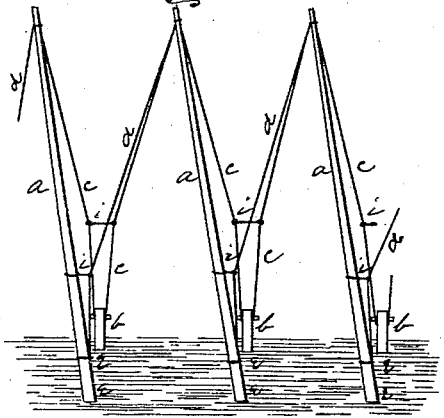
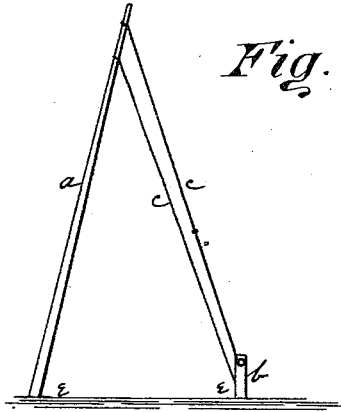
Witnesses:
C. B. Harrison,
Belva A. Lockwood.
Inventor:
Alexander Harroun.

UNITED STATES PATENT OFFICE.

ALEXANDER HARROUN, OF CLOCKVILLE, NEW YORK.

SUPPORT FOR CLIMBING PLANTS.

SPECIFICATION forming part of Letters Patent No. 278,706, dated June 5, 1883.

Application filed February 10, 1883. (No model.)

*To all whom it may concern:*

Be it known that I, ALEXANDER HARROUN, a citizen of the United States, residing at Clockville, in the county of Madison and State of New York, have invented new and useful Improvements in Supports for Climbing Plants and Vines, of which the following is a specification.

In my invention I use poles and cords or poles and posts and cords, the arrangement and combination of which are illustrated in the accompanying drawings; and the designs of my invention, among other things, are to lessen expense as compared with modes in common use, to admit more light and heat to the lower parts of the vines or plants, and to increase the conveniences for gathering the crops which the vines or plants produce.

The drawings illustrate my invention as applied to vines planted in hills—a form of use to which it is best adapted.

Figure 1 gives a perspective view of a part of my invention. Fig. 2 gives a like view of another part. Fig. 3 is a front view of poles and cords, and Fig. 4 gives an end view of Fig. 1 or 2 with an additional line of connection between a pole and post. I also use wire in place of cord or twine where it will answer the purpose better.

The letter *a* in the drawings refers to poles as they would be set in the ground when in use. These poles are of the size and length commonly employed in other similar cases.

The letter *b* refers to posts or pins, which are designed to supply in part the place of poles. Their length is determined by circumstances or the choice of those using them, ranging from a few inches above the surface of the ground to a few feet.

The letter *c* refers to cords or lines connecting post with upper parts of poles. The letter *e*, at the base of posts and poles, indicates the places where vines issue from the ground, and which are to be sustained by the supports.

Fig. 1 of the drawings illustrates a part of my invention in which two supports for each hill of vines is provided by placing a post at one hill and two poles at an opposite hill and connecting the upper parts of the post and poles by lines. The post and poles may interchange, as in Fig. 1, or may remain each upon a separate row, as shown in Fig. 2.

Fig. 2 illustrates an arrangement of parts requiring two posts where only one is required in Fig. 1.

Fig. 3 illustrates a part of my invention in which two supports are provided for each hill of vines by using a number of poles equal to one-half the whole number of hills provided for. This is done by extending lines from a post stationed by a hill of vines to the upper parts of two opposite or adjacent poles, each of the poles being set by a separate hill. The post, with the cords attached to it, gives support to the vines growing by the post. A line is then made fast to the lower part of a pole, and is extended upward and made fast to the upper part of a pole near by. The line which is made fast to the lower part of a pole, together with the pole, afford two supports for the vines growing by the pole. The lines can be increased in number by placing one above the other, as illustrated in Fig. 4. The lines connecting the poles are referred to by the letter *a*.

The letter *i* refers to bands or ties which are employed to restrain lines from diverging too much from each other or from the poles to which they may be attached.

An important part of my invention consists in the position in which I set the poles, and this position adds largely to its value by diminishing expense and by giving admission to light and heat to the lower parts of the vines. I set the poles in a position inclining toward the posts or pins with which they are to be connected. By this arrangement the posts or pins can be so short as to cost but little, and at the same time be so little elevated above the surface of the ground as to make it unnecessary in many cases to remove them each year, as would be done if they were longer. The degree of inclination of the poles may vary somewhat to suit circumstances, but is generally found best to be such as to make the inclination of the pole and of the line attached to the upper part of it about the same. By inclining the poles and lines in this way an opening is made with each second row of plants for the admission of light and warmth, while room is given between the poles and connected posts for the using of horses and of the ordinary appliances for cultivating the ground without increasing the width of the rows. In Figs. 1, 2, and 4 each pole leans toward the post or pin with which it is to be connected on a line nearly parallel with a row. In Fig. 3 each pole leans obliquely to the rows in order to make a suitable connection with an adjoining pole, and also with two adjacent posts. I use two or more posts in the arrangement illustrated by Fig. 3, the same as in the plan illustrated by Fig. 2, whenever a greater separation of lines or any other sufficient reason demands them.

My invention does not include the mere separation of the tops of poles where two or more of them are placed by one hill of vines, as that has long been a common practice.

I claim as my invention—

The divergent leaning poles $a\ a$, the post $b$, and the inclined cords or lines $c\ c$, in combination as set forth, and for the purpose described.

ALEXANDER HARROUN.

Witnesses:
C. B. HARRISON,
BELVA A. LOCKWOOD.